(12) United States Patent
Uematsu et al.

(10) Patent No.: US 11,754,404 B2
(45) Date of Patent: Sep. 12, 2023

(54) TRANSPORT NAVIGATION SYSTEM AND TRANSPORT NAVIGATION METHOD

(71) Applicant: Hitachi, Ltd., Tokyo (JP)

(72) Inventors: Ryota Uematsu, Tokyo (JP); Keiji Kimura, Tokyo (JP); Tsuyoshi Minakawa, Tokyo (JP); Miki Yonehara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 594 days.

(21) Appl. No.: 16/979,370

(22) PCT Filed: Mar. 15, 2019

(86) PCT No.: PCT/JP2019/010838
§ 371 (c)(1),
(2) Date: Sep. 9, 2020

(87) PCT Pub. No.: WO2020/049775
PCT Pub. Date: Mar. 12, 2020

(65) Prior Publication Data
US 2021/0003409 A1   Jan. 7, 2021

(30) Foreign Application Priority Data
Sep. 5, 2018   (JP) ................. 2018-165652

(51) Int. Cl.
*G01C 21/34* (2006.01)
*G06F 17/18* (2006.01)
(Continued)

(52) U.S. Cl.
CPC ......... *G01C 21/3407* (2013.01); *G06F 17/18* (2013.01); *G06Q 30/0202* (2013.01); *G06Q 50/30* (2013.01); *G08G 1/0129* (2013.01)

(58) Field of Classification Search
CPC .............. G01C 21/20; G01C 21/3407; G01C 21/3423; G06F 17/18; G06Q 30/0202;
(Continued)

(56) References Cited

U.S. PATENT DOCUMENTS 6,317,686 B1 * 11/2001 Ran ................. G08G 1/0141
73/178 R
8,401,789 B2 * 3/2013 Natsume .......... G08G 1/096883
701/527
(Continued)

FOREIGN PATENT DOCUMENTS

JP        9-123913 A      5/1997
JP     2007-271283 A     10/2007
(Continued)

OTHER PUBLICATIONS

International Search Report (PCT/ISA/210) issued in PCT Application No. PCT/JP2019/010838 dated Jun. 11, 2019 with English translation (four pages).
(Continued)

*Primary Examiner* — Tyler J Lee
(74) *Attorney, Agent, or Firm* — Crowell & Moring LLP

(57) ABSTRACT

When input information including starting point information and destination information are input, this transport navigation system searches for a route for traveling from the starting point to the destination by a train of a transportation means on the basis of the input information, and outputs travel route information about the travel route obtained. The transport navigation system includes: a storage unit which stores the input information, an actual timetable including actual operation of the train, and a software program; and a CPU which executes the software program with reference to the input information and the actual timetable. The CPU calculates, on the basis of the actual timetable and the input information, the travel route from the starting point to the
(Continued)

Timetable                                D10

| Train No. | Station name | Arrival time | Departure time |
|---|---|---|---|
| 1A | St.A | — | 08:00 |
| 1A | St.B | 08:03 | 08:05 |
| 1A | St.C | 08:10 | 08:12 |
| ... | ... | ... | ... |
| 1A | St.Y | 09:42 | 09:45 |
| 1A | St.Z | 09:50 | — |
| 2A | St.A | — | 08:10 |
| ... | ... | ... | ... | destination and a statistical amount about a travel time according to the travel route, and generate travel route information on the basis of the travel route and the statistical amount.

12 Claims, 16 Drawing Sheets

(51) Int. Cl.
    *G06Q 30/02* (2023.01)
    *G06Q 50/30* (2012.01)
    *G08G 1/01* (2006.01)
    *G06Q 30/0202* (2023.01)

(58) Field of Classification Search
    CPC ........ G06Q 50/30; G08G 1/005; G08G 1/012; G08G 1/0129; G08G 1/0141
    See application file for complete search history.

(56) References Cited

U.S. PATENT DOCUMENTS

| | | | | |
|---|---|---|---|---|
| 11,023,829 | B2* | 6/2021 | Girgensohn | G06Q 50/30 |
| 2009/0005969 | A1* | 1/2009 | Tamura | G01C 21/3476 |
| | | | | 701/533 |
| 2010/0153004 | A1* | 6/2010 | Natsume | G08G 1/096883 |
| | | | | 701/533 |
| 2013/0046456 | A1* | 2/2013 | Scofield | G08G 1/096838 |
| | | | | 701/117 |
| 2013/0204525 | A1 | 8/2013 | Pfeifle | |
| 2014/0310032 | A1* | 10/2014 | Stirlen | G06Q 10/02 |
| | | | | 705/5 |
| 2015/0286936 | A1 | 10/2015 | Furuya et al. | |
| 2015/0308844 | A1 | 10/2015 | Shimazaki et al. | |
| 2018/0037117 | A1* | 2/2018 | Koehler | B60W 10/04 |
| 2018/0172461 | A1* | 6/2018 | Katayama | G01C 21/3617 |
| 2020/0065724 | A1* | 2/2020 | Girgensohn | G06Q 50/30 |

FOREIGN PATENT DOCUMENTS

| | | |
|---|---|---|
| JP | 2008-174145 A | 7/2008 |
| JP | 2010-287251 A | 12/2010 |
| JP | 2014-126500 A | 7/2014 |
| JP | 2016-30542 A | 3/2016 |
| JP | 2016-80513 A | 5/2016 |
| JP | 2016-185806 A | 10/2016 |
| JP | 2016-218073 A | 12/2016 |
| JP | 2017-137059 A | 8/2017 |

OTHER PUBLICATIONS

Japanese-language Written Opinion (PCT/ISA/237) issued in PCT Application No. PCT/JP2019/010838 dated Jun. 11, 2019 (four pages).

Norio et al., "Issues to Realize Demand-oriented Scheduling in Railways", Information Processing Society Research Report Intelligent Transport Systems (ITS), May 23, 2002, pp. 15-22, with English abstract and translation (26 pages).

* cited by examiner

Fig. 2

Timetable  D10

| Train No. | Station name | Arrival time | Departure time |
|---|---|---|---|
| 1A | St.A | — | 08:00 |
| 1A | St.B | 08:03 | 08:05 |
| 1A | St.C | 08:10 | 08:12 |
| ... | ... | ... | ... |
| 1A | St.Y | 09:42 | 09:45 |
| 1A | St.Z | 09:50 | — |
| 2A | St.A | — | 08:10 |
| ... | ... | ... | ... |

Fig. 3

Demand D20

| Train No. | Station name | Passenger count |
|---|---|---|
| 1A | St.A | 200 |
| 1A | St.B | 220 |
| 1A | St.C | 280 |
| ⋮ | ⋮ | ⋮ |
| 1A | St.Y | 150 |
| 1A | St.Z | — |
| 2A | St.A | 230 |
| ⋮ | ⋮ | ⋮ |

Fig. 4

Route information    D30

| Route No. | Line section | Start point | End point | Travel time |
|---|---|---|---|---|
| 1 | Red Line | St.A | St.L | 30 |
| 1 | Orange Line | St.L | St.R | 55 |
| 1 | Yellow Line | St.R | St.Z | 25 |
| 2 | Green Line | St.A | St.P | 40 |
| 2 | Blue Line | St.Q | St.Z | 60 |
| 3 | Indigo Line | St.A | St.X | 25 |
| 3 | Violet Line | St.X | St.Z | 80 |
| ⋮ | ⋮ | ⋮ | ⋮ | ⋮ |

Fig. 15

Route information  D30

| Route No. | Line section | Start point | End point | Travel time |
|---|---|---|---|---|
| 1 | Red Line | St.A | St.L | 30 |
| 1 | — | St.L | St,L | 5 |
| 1 | Orange Line | St.L | St.R | 55 |
| 1 | — | St.R | St.R | 8 |
| 1 | Yellow Line | St.R | St.Z | 25 |
| 2 | Green Line | St.A | St.P | 40 |
| 2 | — | St.P | St.Q | 10 |
| 2 | Blue Line | St.Q | St.Z | 60 |
| 3 | Indigo Line | St.A | St.X | 25 |
| 3 | — | St.X | St.X | 3 |
| 3 | Violet Line | St.X | St.Z | 80 |
| ⋮ | ⋮ | ⋮ | ⋮ | ⋮ |

TRANSPORT NAVIGATION SYSTEM AND TRANSPORT NAVIGATION METHOD

TECHNICAL FIELD

The present invention relates to a transport navigation system that presents to a user a route of a transportation means, the route being extracted in accordance with conditions that the user specifies.

BACKGROUND ART

As for a public transportation means exemplified by railroad transport service, transport navigation services, with which a route matching conditions specified by a user are extracted on the basis of information on train operations and information indicating the routes is presented to the user, are important from a perspective of improving convenience of transport services. For example, in a case of railroad, passengers may be able to specify, as conditions, a starting point (departure station), destination (destination station), and target arrival time (time point at which arriving at the destination station is desired), receive information on routes extracted by the transport navigation system on the basis of these conditions, and determine a travel route to be actually used.

Moreover, as an indicator that passengers take into consideration when selecting a travel route, there is congestion of railcars, which is an element that affects the comfort of the passenger, in addition to the time and fares required to travel. When a train is crowded, the personal space of individual passengers becomes constricted, leading to increased discomfort. Thus, many passengers avoid trains crowded at high density and select trains on other routes.

Accordingly, route navigation that takes into account congestion is being studied. For example, PTL 1 discloses an information processing system with an object to "search, at one time, a plurality of transfer routes with low congestion and display results close to those a user desires so that a result that is the closest to what the user desires can be selected", with this information processing system being configured to: "acquire transfer search conditions including departure time of a transportation means and a stop point of departure of the transportation means and a destination stop point of the transportation means; search for a transfer route of the transportation means departing during a predetermined time block, which includes the departure time included in the acquired transfer search conditions, from the stop point of departure to the destination stop point by using network information; generate route information relating to the transfer route; acquire crowding information relating to crowding on the transportation means of the searched transfer route; and display, on a display unit, route navigation information including the generated route information and the acquired crowding information". In PTL 1, decision-making of the passenger is supported even for a case where a travel route with low congestion is desired, by displaying past crowding information that is accumulated along with the route navigation information.

In order to improve convenience of railroad transport services themselves, dynamically changing the train schedule diagram in accordance of the demand for travel on a current day is also being studied (see NPL 1). It is anticipated that with this, efficient train operations with a high level of convenience is realized.

CITATION LIST

Patent Literature

[PTL 1]
Japanese Patent Application Publication No. 2016-218073

Non Patent Literature

[NPL 1]
Tomii, Ono, Goto, Fukumura, Tsuchiya: "Issues to Realize Demand-oriented Scheduling in Railways", Information Processing Society Research Report Intelligent Transport Systems (ITS), pp. 15-22 (2002)

SUMMARY OF INVENTION

Technical Problem

Passengers need to be provided with appropriate route navigation services even when train schedule diagrams have come to be dynamically changed in accordance with the demand for travel on a current day as disclosed in NPL 1. However, the following problems may arise in a case where route navigation using the technology disclosed in PTL 1 is performed in a situation in which train schedule diagrams are dynamically changed in accordance with demand for travel.

In the information processing system disclosed in PTL 1, navigation information is created on the basis of a train schedule diagram that has been scheduled no later than the previous day. Accordingly, if the train schedule diagram is dynamically changed on a current day, passengers may be provided with navigation information that is different from information on operations of the trains actually departing from or arriving at stations at time points (hereinafter referred to as "train operations").

Also, even if there is a route more appropriate than the route extracted on the basis of the train schedule diagram that has been scheduled no later than the previous day, there is a possibility that the information on this route cannot be provided to passengers. For example, in a case where a relief train has been added on that current day to a certain line to relieve crowding, the relief train is not included in the train schedule diagram that has been scheduled no later than the previous day. Even if, by using the relief train, there is a possibility of being able to reach the destination at an earlier time than according to the route extracted on the basis of the train schedule diagram that has been scheduled no later than the previous day, passengers cannot be presented with information navigating the route using the relief train. In such a case, there is a possibility that passengers miss the opportunity of using the relief train.

Also, in addition to cases where the train schedule diagram is dynamically changed in accordance with demand for travel as described above, there are similar issues with lines where schedule-diagram undependability is high, such as lines where trains are perpetually running late, for example. Accordingly, navigation information that conforms to the situation of ae current day is needed to support decision-making of the passenger.

In light of the above, it is an object of the present invention to provide a technology that enables route navigation information to be presented assuming that dynamic change is implemented on train schedule diagrams.

Solution to Problem

A transport navigation system according to an aspect of the present invention is an transport navigation system, which, upon input information including information on a starting point and information on destination being input, searches, on the basis of the input information, for a route to travel from the starting point to the destination by a transportation means including a train, and which outputs travel route information relating to the travel route that has been obtained, the transport navigation system including: a storage unit configured to store the input information, an actual timetable according to which a train has actually been operated, and a software program; and a CPU configured to reference the input information and the actual timetable and execute the software program, wherein the CPU is configured to calculate, on the basis of the actual timetable and the input information, a travel route from the starting point to the destination and a statistical amount relating to a travel time according to the travel route and generate the travel route information on the basis of the travel route and the statistic amount.

Advantageous Effects of Invention

According to the present invention, the statistical amount relating to travel routes and time required are calculated from past operation history, and travel route information is generated on the basis of the travel route and the statistical amount, and accordingly route navigation information that is suitable in light of past history can be presented even in a case where dynamic change of the train schedule diagram is anticipated and there is a possibility that suitable travel routes and travel time will change in the future.

BRIEF DESCRIPTION OF DRAWINGS

FIG. 2 is a diagram illustrating an example of a timetable according to the first embodiment.

FIG. 3 is a diagram illustrating an example of demand according to the first embodiment.

FIG. 4 is a diagram illustrating an example of route information according to the first embodiment.

FIG. 15 is a diagram illustrating an example of route information according to a modification of the first embodiment.

DESCRIPTION OF EMBODIMENTS

First Embodiment

A first embodiment will be described below in detail with reference to FIG. 1 to FIG. 14.

(1.1 System Configuration)

Figure 1:
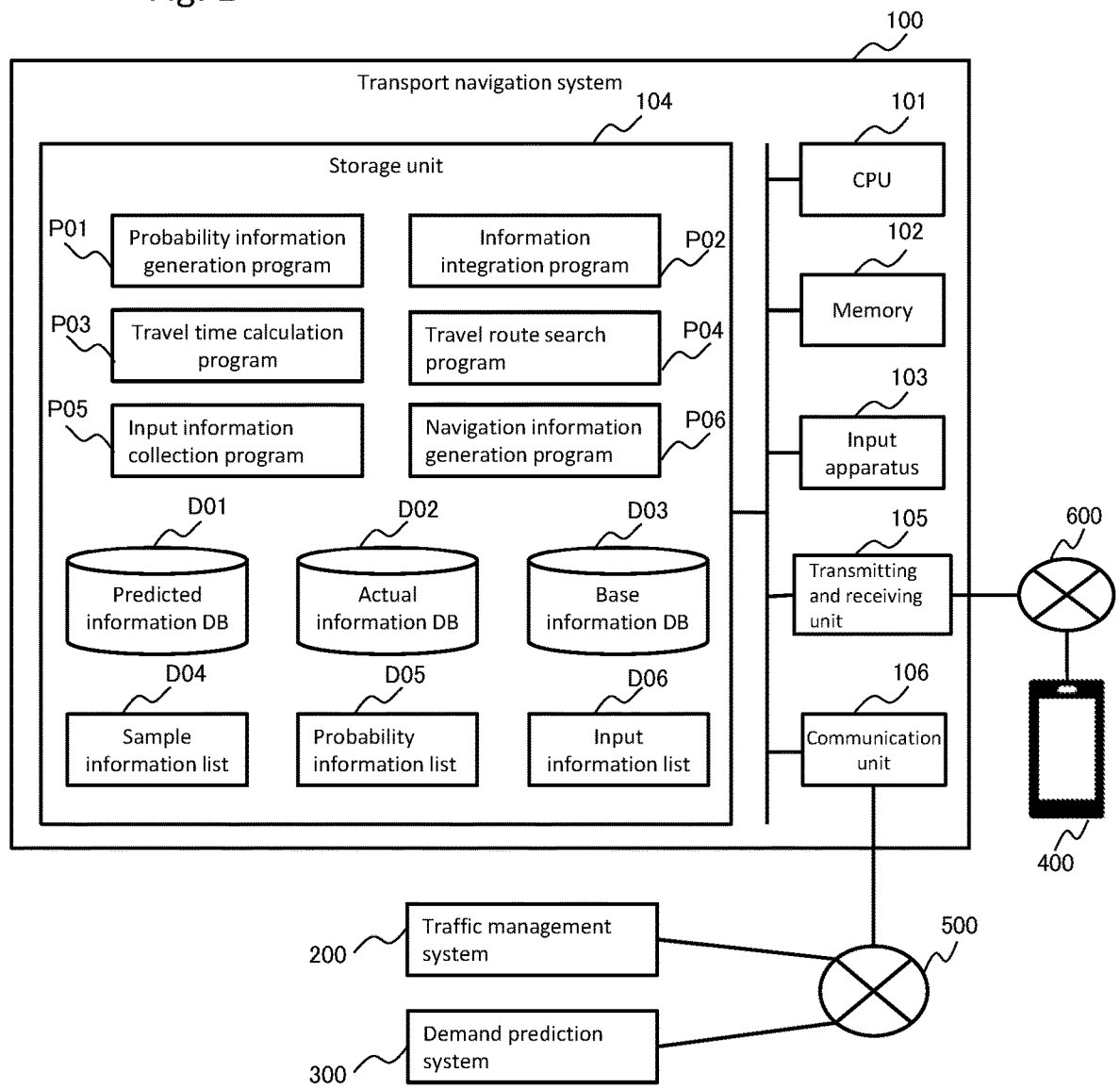
FIG. 1 is a block diagram illustrating a configuration of a transport navigation system according to a first embodiment.

FIG. 1 is a diagram illustrating a system configuration according to the first embodiment.

A transport navigation system 100, an traffic management system 200, and a demand prediction system 300 are connected via a communication network 500 so as to capable of communicating with each other, as illustrated in FIG. 1. The transport navigation system 100 and a user terminal 400 are connected via a communication network 600 so as to capable of communicating with each other.

The transport navigation system 100 receives a navigation request from the user terminal 400, appropriately creates or updates navigation information imparted with probability information, on the basis of information stored in the system, information acquired from the traffic management system 200, and/or information acquired from the demand prediction system 300, and makes notification thereof to the user terminal 400.

The traffic management system 200 controls a plurality of trains within a train operation network that is a management target, in accordance with train timetables. The traffic management system 200 has prediction functions, and predicts future train timetables from current train timetables. The traffic management system 200 notifies the transport navigation system 100 of the timetables via the communication network 500.

The demand prediction system 300 predicts the number of passengers on the trains controlled by the traffic management system 200 at the time of departing from each station. The demand prediction system 300 notifies the transport navigation system 100 of demand via the communication network 500.

The user terminal 400 is a terminal that displays navigation information to the user. The user terminal 400 notifies the transport navigation system 100 of navigation requests that the user inputs, via the network 600.

The transport navigation system 100 has a CPU (Central Processing Unit) 101, memory 102, an input apparatus 103, a storage unit 104, a transmitting and receiving unit 105, and a communication unit 106.

The CPU 101 is a processing apparatus that executes a computer program (hereinafter reference to as "program") stored in the storage unit 104. The memory 102 is a storage apparatus (e.g., DRAM (Dynamic Random Access Memory) that provides a work area for the CPU 101. The CPU 101 writes data to the memory 102 and reads data from the memory 102 when executing the program.

The input apparatus 103 notifies the transport navigation system 100 of information relating to operations input by an operator. The input apparatus 103 is, for example, a keyboard and/or a mouse. A mouse is commonly referred to as a pointing device. In the first embodiment, a mouse is assumed as a pointing device. However, the first embodiment may use another pointing device, such as, for example, a trackball or a pointing stick, a touchpad, a touch panel, a pen tablet, or the like.

The storage unit 104 is a storage apparatus (e.g., HDD (Hard Disk Drive) or SSD (Solid State Drive) or the like) storing various types of programs executed by the CPU 101 and various types of data that the CPU 101 uses for processing. Data and so forth saved in the storage unit 104 may be read from the storage unit 104 and duplicated in the memory 102. Also, data and so forth saved in the memory 102 may be read from the memory 102 and duplicated in the storage unit 104. Accordingly, in a case of saving data and so forth in the storage apparatus, that data can hereafter be read from either of the memory 102 and the storage unit 104. Also, in a case of reading data from the storage apparatus, data and so forth saved in one of the memory 102 and the storage unit 104 is read.

The transmitting and receiving unit 105 is connected to the communication network 600. The transport navigation system 100 exchanges data with the user terminal 400 via the transmitting and receiving unit 105 and the communication network 600.

The communication unit 106 is connected to the communication network 500. The transport navigation system 100 communicates with the traffic management system 200 and the demand prediction system 300 via the communication unit 106 and the communication network 500.

Stored in the storage unit 104 are a probability information generation program P01, an information integration program P02, a travel time calculation program P03, a travel route search program P04, a navigation information collection program P05, and a navigation information generation program P06. Also stored in the storage unit 104 are a predicted information database D01, an actual information database D02, a base information database D03, a sample information list D04, a probability information list D05, and an input information D06.

The probability information generation program P01 is executed by the CPU 101 to generate probability information relating to navigation information, and so forth, on the basis of various types of information stored in the predicted information database D01, the actual information database D02, and the base information database D03. The probability information generation program P01 also generates sample information.

The information integration program P02 is executed by the CPU 101 to integrate information. The information integration program P02 performs the processing of the following (A1) and (A2).

(A1) The information integration program P02 acquires a predicted timetable and predicted demand from the traffic management system 200 and the demand prediction system 300, imparts an acquisition date-and-time of the predicted information, and generates predicted integration information. The information integration program P02 then stores the generated predicted integration information in the predicted information database D01. The predicted timetable is information predicting at what time trains will arrive at which stations or will depart from which stations. The predicted demand is information predicting how many passengers that trains will have on board when departing from which stations. The acquisition date-and-time of the predicted information indicates the date and time when this predicted timetable and this predicted demand were acquired. The information integration program P02 acquires the predicted timetable and the predicted demand at a predetermined cycle (e.g., every 30 minutes), generates predicted integration information, and stores in the predicted information database D10.

(A2) The information integration program P02 acquires an actual timetable and an actual demand from the traffic management system 200 and the demand prediction system 300, imparts with an acquisition date-and-time of the actual information, and generates actual integration information. The information integration program P02 then stores the generated actual integration information in the actual information database D02. The actual timetable is information indicating at what time trains actually arrived at which stations and departed from which stations. The actual demand is information indicating how many passengers trains actually had on board when departing from which stations. The acquisition date-and-time of the actual information is information indicating the date and the time when this actual timetable and this actual demand were acquired. For example, this indicates the date-and-time at which this actual timetable and actual demand were finalized after the day's train operations ended. The information integration program P02 acquires the actual timetable and the actual demand when a day of train operations ends, generates the actual integration information, and stores in the actual information database D02.

The travel time calculation program P03 is executed by the CPU 101 and calculates travel time between each of the stations and/or a given route, on the basis of the various types of information in the base information database D03. Note that the travel time calculation program P03 may calculate travel time between each of the stations before creating the navigation information, and store the calculated travel time in the storage unit 104. Accordingly, the time until displaying the navigation information can be shortened. Also, the travel time calculation program P03 may calculate the travel time using known technology.

The travel route search program P04 is executed by the CPU 101 to search for a travel route from a station of departure to a destination station, on the basis of the station of departure, the destination station, and the arrival time (or departure time) and so forth input by the user. The travel route search program P04 may search for travel routes using known technology.

The input information collection program P05 is executed by the CPU 101 to collect input information (navigation request) which the user has input to the user terminal 400, and stores the collected input information in the input information list D06.

The navigation information generation program P06 is executed by the CPU 101 to generate navigation information on the basis of probability information travel time information, and travel route information.

The predicted information database D01 stores the predicted integration information generated by the information integration program P02.

The actual information database D02 stores the actual integration information generated by the information integration program. P02.

The base information database D03 stores information relating to facilities that are used by the programs in common. For example, the base information database D03 stores information of station layout, transfer time, and so forth, which is information necessary for creating navigation information.

At least one piece of sample information is registered in the sample information list D04. Sample information will be described in detail later.

At least one piece of probability information is registered in the probability information list D05. The probability information is information indicating around what the probability is for the travel time, from departing from a starting point to reach destination via a certain travel route, to be around a certain amount of time. Probability information will be described in detail later.

At least one piece of input information is registered in the input information list D06. Input information is information relating to input information (navigation request) input to the user terminal 400. The input information includes information such as, for example, station of departure, destination station, departure time, arrival time, congestion, reliability, and so forth. congestion is an indicator representing how many passengers are actually on board, as to a maximum passenger capacity of a railcar. Reliability is an indicator representing to what degree a train can actually arrive at a certain station by predicted arrival time.

(1.2 Data Structure)
(1.2.1 Data Structure of Timetables)

The data structure of a timetable D10 will be described with reference to FIG. 2. The predicted timetable and the actual timetable described above each have the data structure of this timetable D10.

As illustrated in FIG. 2, the timetable D10 has, as data items, train No., station name, arrival time, and departure time.

Nos. for identifying trains are stored in the train No.

The names of stations that trains of train Nos. in corresponding rows stop at or pass are stored in station name.

The time points that trains of train Nos. in corresponding rows arrive at stations of station names in corresponding rows are stored in arrival time. The "-" in the arrival time indicates that no arrival time exists, due to the station of the station name in the corresponding row being a starting station or a non-stop station or the like, for example. Note that this arrival time is predicted arrival time in the case of a predicted timetable, and is actual arrival time in a case of an actual timetable.

The time points that trains of train Nos. in corresponding rows depart from stations of station names in corresponding rows are stored in departure time. The "-" in the departure time indicates that no departure time exists, due to the station of the station name in the corresponding row being a terminal station or the like, for example. Note that this departure time is predicted departure time in the case of a predicted timetable, and is actual departure time in a case of an actual timetable.

The timetable D10 exemplified in FIG. 2 indicates the following. That is to say, the first row indicates that a train of train No. "1A" departs from station of station name "St. A" at departure time "8:00". The second row indicates that the train of the same train No. "1A" arrives at station of station name "St. B" at arrival time "8:03", and departs at departure time "8:05". The other rows are similar. Also, rows partway through are omitted by " . . . ".

Note that the time point of passing non-stop stations may be stored in the departure time. Alternatively, a new data item "passage time" may be provided in the timetable D10.

(1.2.2 Data Structure of Demand)

The data structure of a demand D20 will be described with reference to FIG. 3. The predicted demand and actual demand described above each have the data structure of this demand D20.

As illustrated in FIG. 3, the demand D20 has, as data items, train No., station of departure, and passenger count.

Nos. for identifying trains are stored in the train No.

The names of stations that trains of train Nos. in corresponding rows stop at or depart from are stored in station name.

The numbers of passengers onboard trains train Nos. in corresponding rows when departing from stations of station names in corresponding rows are stored in passenger count. Note that the "-" in the passenger count indicates that no value exists, due to the station of the station name in the corresponding row being a non-stop station or terminal station or the like, for example. Note that this passenger count is a predicted passenger count in the case of a predicted demand, and is an actual passenger count in a case of an actual demand.

The demand D20 exemplified in FIG. 3 indicates the following. That is to say, the first row indicates that when a train of train No. "1A" departs from station of station name "St. A", passengers of a passenger count "200" are on board. The second row indicates that when the train of the same train No. "1A" stops at and departs from station of station name "St. B", passengers of a passenger count "220" are on board. The other rows are similar. Also, rows partway through are omitted by " . . . ".

(1.2.3 Data Structure of Route Information)

The data structure of a route information D30 will be described with reference to FIG. 4.

As illustrated in FIG. 4, the route information D30 has, as data items, route No., line section, start point, end point, and travel time.

Nos. for identifying routes are stored in the route No.

The names of line sections that are included in routes indicated by route Nos. in corresponding rows are stored in line section.

The names of stations that are points of origin in line sections indicated by line section names in corresponding rows are stored in start point.

The names of stations that are terminal points in line sections indicated by line section names in corresponding rows are stored in end point.

The time for trains departing from stations indicated by start points in corresponding rows to arrive at stations indicated by end points in corresponding rows are stored in travel time.

The route information D30 exemplified in FIG. 4 indicates the following. That is to say, the first row indicates that the travel time from a start point "St. A" on line section "Redline" on route No. "1" to an end point "ST. L" is "30 minutes". The second row indicates that the travel time from a start point "St. L" on line section "Orange line" on route No. "1" to an end point "St. R" is "55 minutes". The other rows are similar. Also, rows partway through are omitted by (1.2.4 Data Structure of Integration Information)

The data structure of integration information D40 will be described with reference to FIG. 5. The above-described predicted integration information and actual integration information each have the data structure of this integration information D40.

Figure 5:
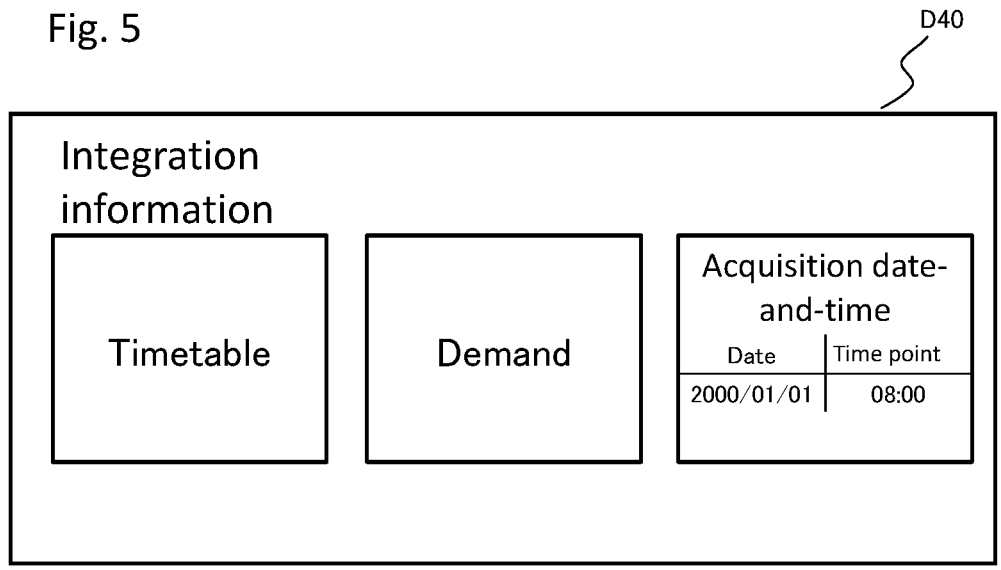
FIG. 5 is a diagram illustrating an example of integration according to the first embodiment.

The integration information D40 has timetable, demand, and acquisition date-and-time, as illustrated in FIG. 5.

The timetable is a predicted timetable in the case of predicted integration information, and is an actual timetable in the case of actual integration information.

The demand is predicted demand in the case of predicted integration information, and is actual demand in the case of actual integration information.

The acquisition date-and-time is an acquisition date-and-time of the predicted information in the case of predicted integration information, and is an acquisition date-and-time of the actual information in the case of actual integration information. The integration information D40 can be uniquely identified by the acquisition date-and-time.
(1.2.5 Structure of Predicted information Database)

Figure 6:
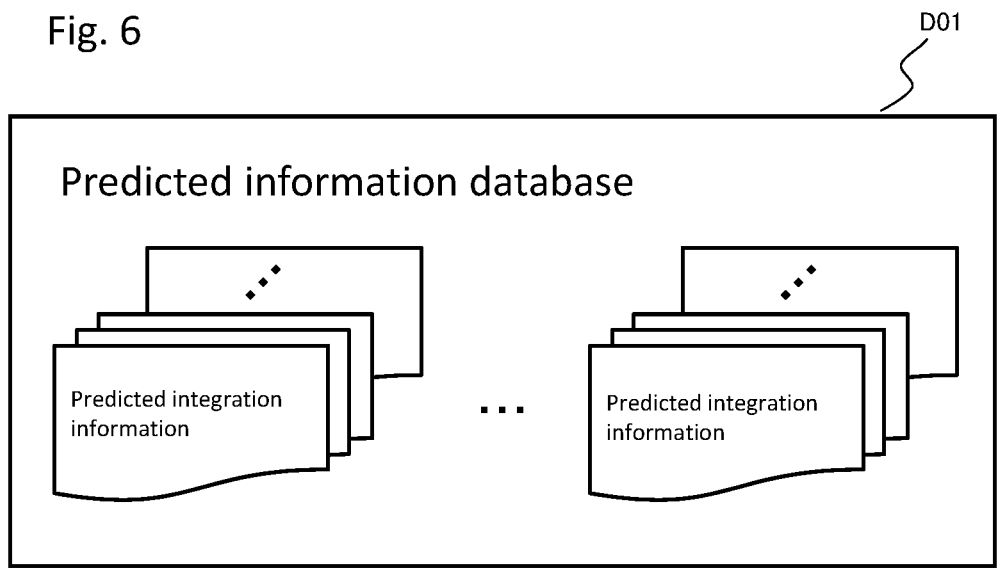
FIG. 6 is a diagram illustrating an example of a predicted information database according to the first embodiment.

The structure of the predicted information database D01 will be described with reference to FIG. 6. The predicted information database D01 stores a plurality of pieces of predicted integration information registered at a certain cycle, grouped in increments of one day, as illustrated in FIG. 6.
(1.2.6 Structure of Actual Information Database)

Figure 7:
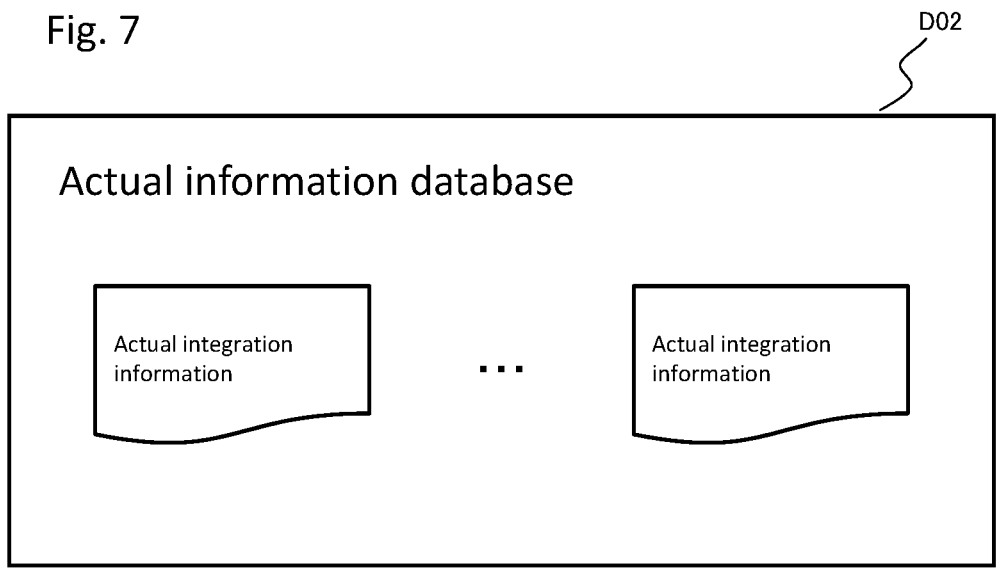
FIG. 7 is a diagram illustrating an example of an actual information database according to the first embodiment.

The structure of the actual information database D02 will be described with reference to FIG. 7. The actual information database D02 stores the actual integration information registered after a day of operation of trains, in increments of one day, as illustrated in FIG. 7.
(1.2.7 Data Structure of Sample Information)

Figure 8:
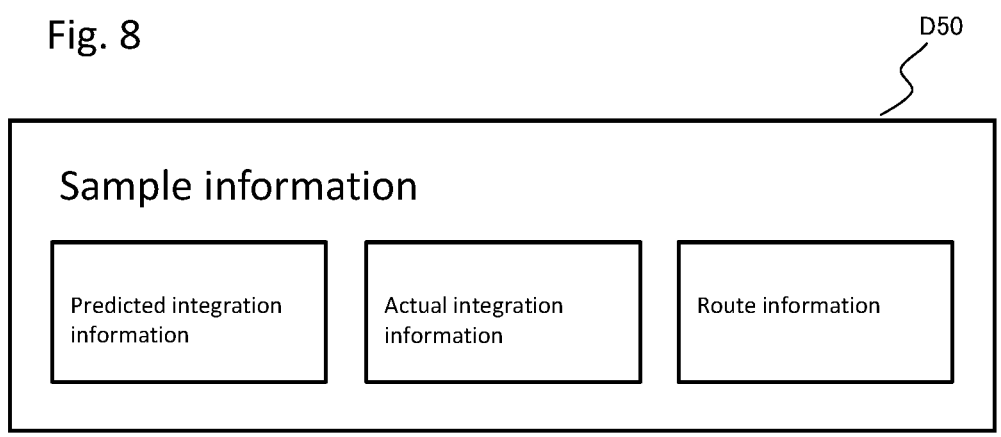
FIG. 8 is a diagram illustrating an example of sample information according to the first embodiment.

The data structure of sample information D50 will be described with reference to FIG. 8. The sample information D50 has predicted integration information, actual integration information, and route information, as illustrated in FIG. 8. This predicted integration information and actual integration information have been extracted as samples regarding a travel route indicated in the route information.
(1.3 Processing by Transport Navigation System) (1.3.1 Overview)

Figure 9:
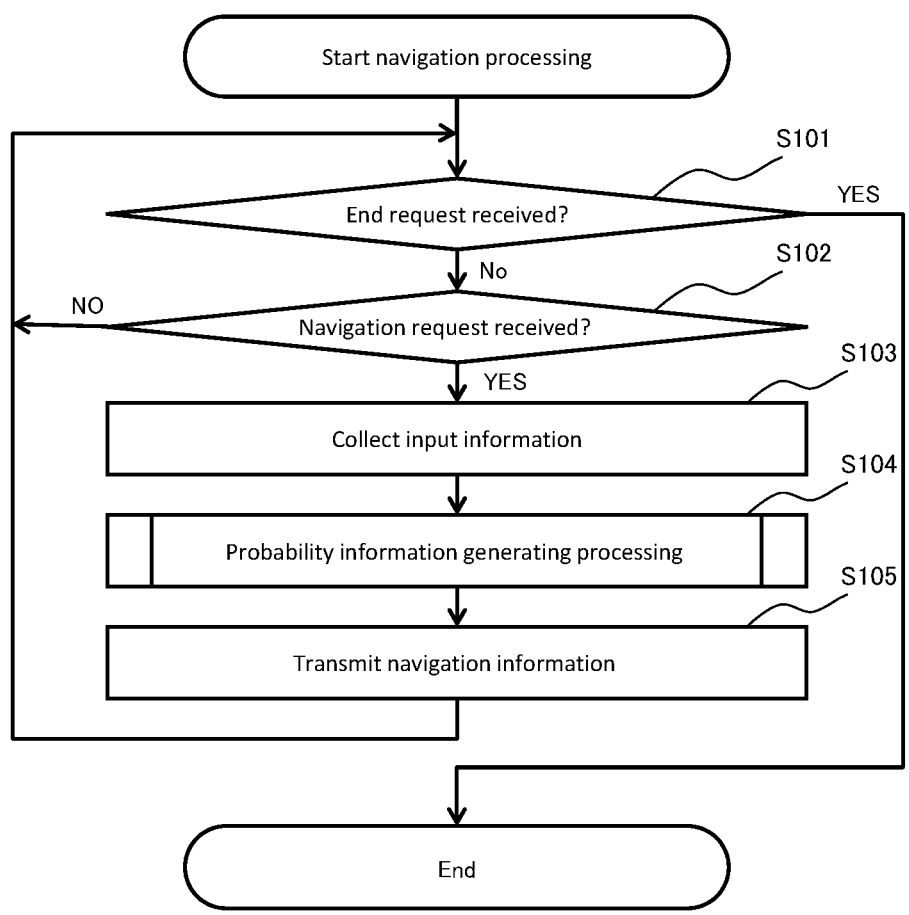
FIG. 9 is a flowchart illustrating an overview of processing of the transport navigation system according to the first embodiment.

An overview of processing by the transport navigation system 100 will be described with reference to the flowchart illustrated in FIG. 9.

As step S101, the CPU 101 of the transport navigation system 100 determines whether or not an end request for this processing is received. In a case where an end request for this processing is not received (S101: NO), the flow advances to step S102. In a case where an end request for this processing is received (S101: YES), the CPU 101 ends this processing (navigation ended).

As step S102, the CPU 101 determines whether or not a navigation request is received from the user terminal 400. In a case where a navigation request is received (S102: YES), the flow advances to step S103. In a case where a navigation request is not received (S102: NO), the flow returns to step S101.

As step S103, the CPU 101 of the transport navigation system 100 executes the input information collection program P05 to store a station of departure (or starting point), arrival station (or destination), departure time (or arrival time), and reliability of being able to arrive at the arrival station (or destination) by a predetermined time, included in the navigation request, in the storage unit 104 as the input information D06. Note that in a case where there is no value requested as the departure time, the current time may be used as the departure time, and in a case where there is no value requested as the reliability, a predetermined value may be used as the reliability.

As step S104, the CPU 101 of the transport navigation system 100 executes the probability information generation program P01 to execute probability information generating processing using information of the predicted information database D01, the actual information database D02, the base information database D03, the sample information D04, and the input information D06. Note that details of the processing in this step S104 will be described later.

As step S105, the CPU 101 generates navigation information on the basis of the probability information, and transmits the generated navigation information to the user terminal 400.

(1.3.2 Details of Step S104: Probability Information Generating Processing)

Figure 10:
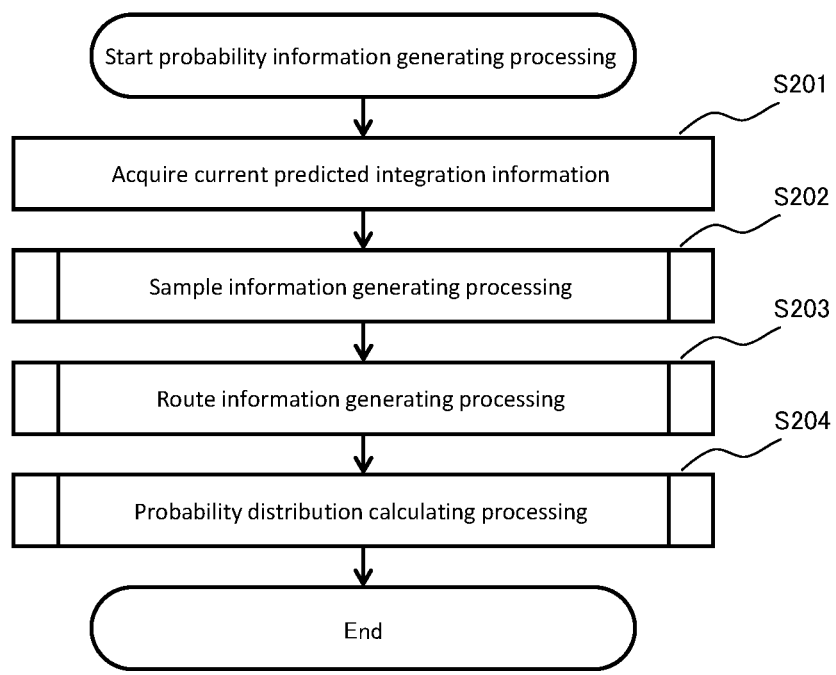
FIG. 10 is a flowchart illustrating details of probability information generating processing according to the first embodiment.

Details of the probability information generating processing in step S104 illustrated in FIG. 9 will be described with reference to the flowchart illustrated in FIG. 10.

As step S201, the CPU 101 acquires predicted integration information of which the time information is the newest, from the predicted information database D01, as current predicted integration information. Note that the current predicted integration information may be stored in a database or storage unit other than the predicted information database D01.

As step S202, the CPU 101 executes sample information generating processing. The sample information is used for generating probability information. Note that details of the processing of step S202 will be described later.

As step S203, the CPU 101 executes route information generating processing. Note that details of the processing of step S203 will be described later.

As step S204, the CPU 101 executes probability distribution calculating processing. Note that details of the processing of step S204 will be described later.
(1.3.3 Details of Step S202: Sample Information Generating Processing)

Figure 11:
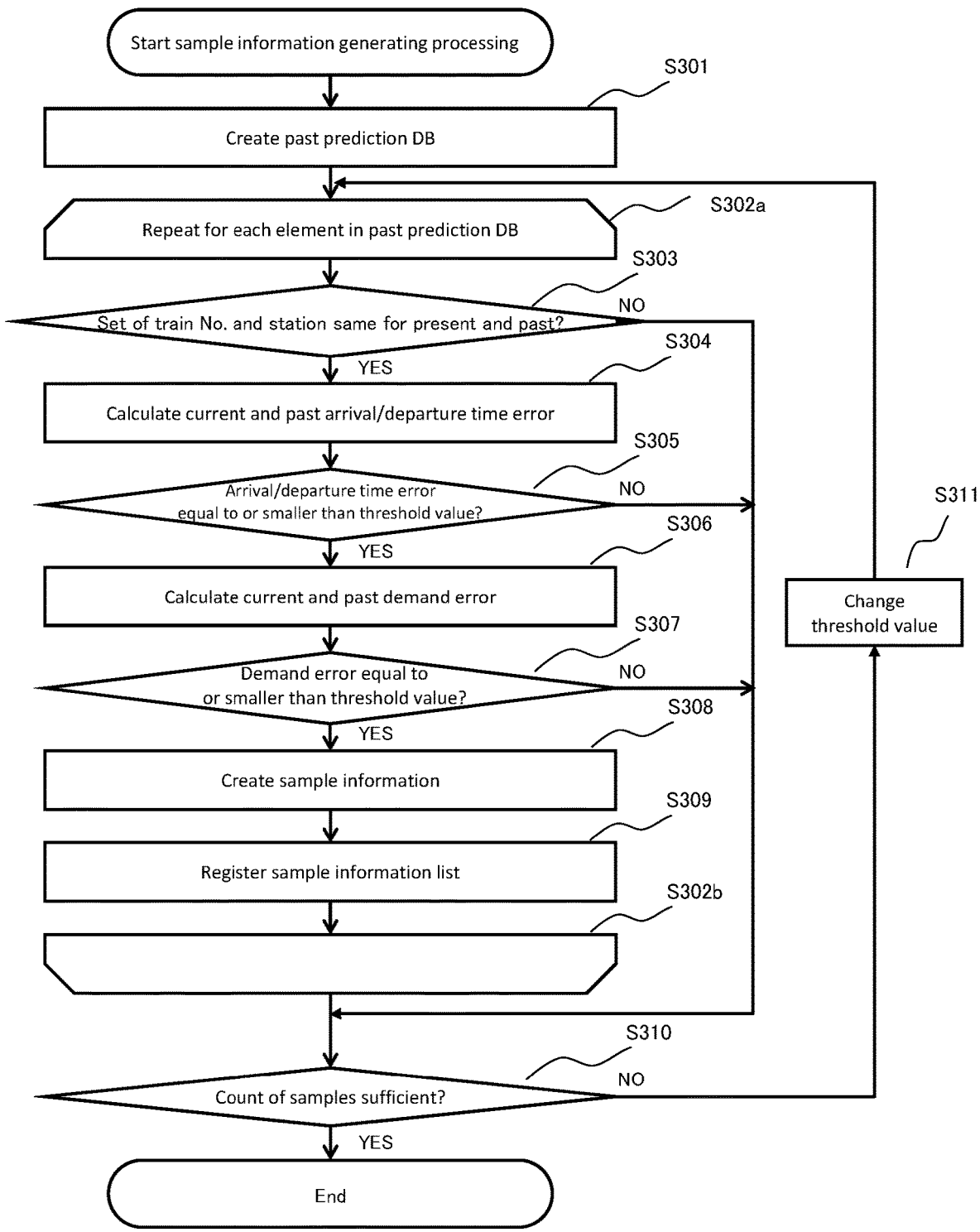
FIG. 11 is a flowchart illustrating details of sample information generating processing according to the first embodiment.

Details of the sample information generating processing in step S202 illustrated in FIG. 10 will be described with reference to the flowchart illustrated in FIG. 11.

As step S301, on the basis of the date-and-time included in the acquisition date-and-time of the predicted information in the current predicted integration information (hereinafter referred to as "current prediction date-and-time"), the CPU 101 creates a past prediction database relating to the current prediction date-and-time. For example, the CPU 101 extracts, from the predicted information database D01, all predicted integration information excluding that which is the same as the current predicted integration information acquired in step S201 (i.e., past predicted integration information). The CPU 101 then identifies predicted integration information in the extracted past predicted integration information, of which the time point included in the acquisition date-and-time of the predicted information (hereinafter, referred to as "past prediction date-and-time") matches the current predicted time, and stores the identified past predicted integration information in a past prediction data base relating to the current predicted time. Note that this determination of matching does not have to be a precise match. For example, a match may be determined to be made in a case where the past predicted time belongs to a predetermined range from the current predicted time.

As step S302a, the CPU 101 performs loop processing from step S303 to step S309 on each piece of the past predicted integration information stored in the past prediction database relating to the current predicted time. Hereinafter the past predicted integration information selected as being a target of this loop processing will be referred to as "target predicted integration information". Also, the processing of steps S303 to S307 below is an example of processing of determining whether the current predicted integration information is similar to the target predicted integration information or not.

As step S303, the CPU 101 determines whether or not sets of train No. and station of the timetable included in the target predicted integration information all match a set of train No. and station of the timetable included in the current predicted integration information. In a case of determining in step S303 that all match (S303: YES), the flow advances to step S304, and in a case of determining that at least one does not match (S303: NO), the flow advances to step S302a.

As step S304, the CPU 101 calculates difference (error) between the arrival time in the timetable included in the current predicted integration information and the train arrival time in the timetable included in the target predicted integration information, for each train, and totals the differences. The CPU 101 also calculates difference (error) between the train departure time in the timetable included in the current predicted integration information and the train departure time in the timetable included in the target predicted integration information, for each train, and totals the differences. The CPU 101 further totals the sum of differences regarding the arrival time and the sum of differences regarding the departure time, to calculate an arrival/departure time error. Note that calculation of the arrival/departure time error does not necessarily have to use the arrival time and/or the departure time for all trains included in the timetable, and the arrival time and/or the departure time for part of the trains included in the timetable may be used, such as sectioning trains that are the target of calculation before and after certain time. Also, error regarding the arrival time (arrival time error) error regarding the departure time (departure time error) may be stored separately.

As step S305, the CPU 101 determines whether or not the arrival/departure time error is equal to or smaller than a predetermined threshold value. In a case where the arrival/departure time error is equal to or smaller than the predetermined threshold value (S305: YES), the flow advances to step S306, and in a case where the arrival/departure time error is larger than the predetermined threshold value (S305: NO), the flow returns to step S302a. Note that the arrival/departure time error may be separately stored as arrival time error and departure time error, with similarity evaluation of arrival time and departure time being separately performed using two types of threshold values. Also, just one of the arrival time error and the departure time error may be handled as the arrival/departure time error.

As step S306, the CPU 101 calculates, for each train, difference (error) between the passenger count that the demand that is included in the current predicted integration information indicates and the passenger count that the demand included in the target predicted integration information indicates, and totals the errors. Hereinafter, this total of differences will be referred to as "demand error". Note that the demand error may be calculated for part of the trains regarding the two demands being compared, such as sectioning target trains before and after time data in various types of data.

As step S307, the CPU 101 determines whether or not the demand error is equal to or smaller than a predetermined threshold value. In a case where the demand error is equal to or smaller than the predetermined threshold value (S307: YES), the flow advances to step S308, and in a case where the demand error is greater than the predetermined threshold value (S307: NO), the flow returns to step S302a.

As step S308, the CPU 101 creates sample information. For example, the CPU 101 extracts actual integration information that has the same date as the time information of the target predicted integration information (hereinafter referred to as "same-date actual integration information") from the actual information database D02. The CPU 101 creates the sample information D50 on the basis of the target predicted integration information and the same-date actual integration information. This target predicted integration information is past integrated predicted information, determined to be similar to the current predicted integration information in steps S303 to S307, as described above.

As step S309, the CPU 101 registers the sample information D50 created in step S308 in the sample information list D04.

As step S302b, in a case where the loop processing regarding step S302a is incomplete, the flow returns to step S302a, while in a case where the loop processing is complete, the flow advances to step S310.

As step S310, the CPU 101 determines whether or not the registration count of the sample information D50 in the sample information list D04 is equal to or larger than a predetermined threshold value. In a case where the registration count of the sample information D50 is equal to or larger than the predetermined threshold value (S310: YES), the flow ends. In a case where the registration count of the sample information D50 is smaller than the predetermined threshold value (S310: NO), the CPU 101 advances to step S311.

As step S311, the CPU 101 changes at least one threshold value in step S305 and step S307 in a direction of easing, and the flow returns to S302a. That is to say, the determination of similarity is eased, and the registration count of sample information D50 in the sample information list D04 is increased.

(1.3.4 Details of Step S203: Route Information Generating Processing)

Figure 12:
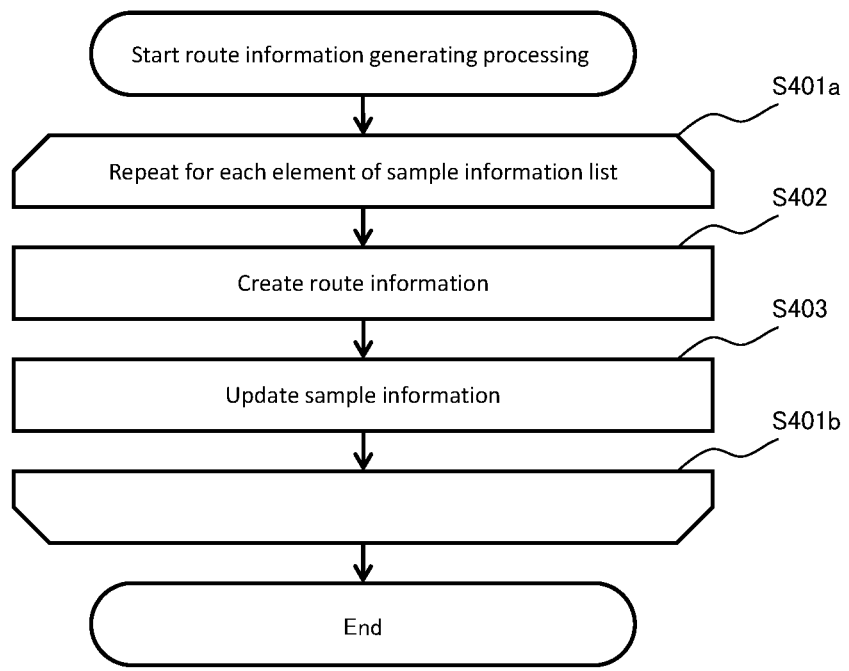
FIG. 12 is a flowchart illustrating details of route information generating processing according to the first embodiment.

Details of the route information generating processing of step S203 in FIG. 10 will be described with reference to the flowchart illustrated in FIG. 12.

As step S401a, the CPU 101 performs the loop processing of step S402 to step S403 on the actual integration information of each piece of sample information registered in the sample information list D04 in step S202. Hereinafter, the actual integration information selected as the target of the loop processing of step S402 to step S403 will be referred to as "target actual integration information".

As step S402, the CPU 101 generates the route information D30 on the basis of the target actual integration information and the navigation request. For example, the CPU 101 calculates the travel time and travel route regarding the input information D06 reflecting the navigation request, on the basis of the target actual integration information, and generates the route information D30. Calculation of the travel time and travel route may be performed on the basis of known technology (e.g., Japanese Patent Application Publication No. 2007-271283), by the CPU 101 executing the travel time calculation program P03 and the travel route search program P04.

As step S403, the CPU 101 includes the route information D30 generated in step S402 in the sample information that includes the target actual integration information.

As step S401b, in a case where the loop processing regarding step S401a is incomplete, the flow returns to step S401a, while in a case where the loop processing is complete, the flow ends.

(1.3.5 Details of Step S204: Probability Distribution Generating Processing)

Details of the probability distribution generating processing of step S204 in FIG. 10 will be described with reference to the flowchart illustrated in FIG. 13.

As step S501, the CPU 101 creates a travel route list on the basis of the route information D30 registered in the sample information list D04. For example, the CPU 101 extracts all route Nos. of route information D30 registered in the sample information list D04, and registers the extracted route Nos. in the travel route list. For example, all route Nos.

are registered in the travel route list, such as route No. 1, route No. 2, route No. 3, . . . in the case in FIG. 4.

As step S502a, the CPU 101 performs loop processing from step S503 to step S505 on each route No. registered in the travel route list. Hereinafter, route Nos. selected as the target of the loop processing from step S503 to step S505 will be referred to as "target route Nos.".

As step S503, the CPU 101 extracts sample information D50 of which a route No. of route information D30 is the same as with the target route Nos. from the sample information list D04, and registers the extracted sample information D50 in a same-route information list. That is to say, the same-route information list is data existing as a set of sample information corresponding to the same route.

As step S504, the CPU 101 creates a histogram on the basis of the same-route information list created in step S503. For example, the CPU 101 first configures a predetermined class width. The CPU 101 next references the travel time in the route information D30 and calculates the total value of travel time of the target route Nos. in all pieces of sample information D50 in the same-route information list, and adds an arrival frequency corresponding to the class width in which the total value is included. The arrival frequency is a value representing the number of time that the travel time of each piece of sample information D50 is included in the class width. That is to say, this arrival frequency is a value with regard to this class width of the histogram.

As step S505, the CPU 101 registers the histogram created in step S504 as probability information.

As step S502b, in a case where the loop processing regarding step S502a is incomplete, the flow returns to step S502a, while in a case where the loop processing is complete, the flow ends.

(1.4 Navigation information Displayed on User Terminal)

The navigation information displayed on the user terminal 400 will be described with reference to FIG. 14.

Figure 14:
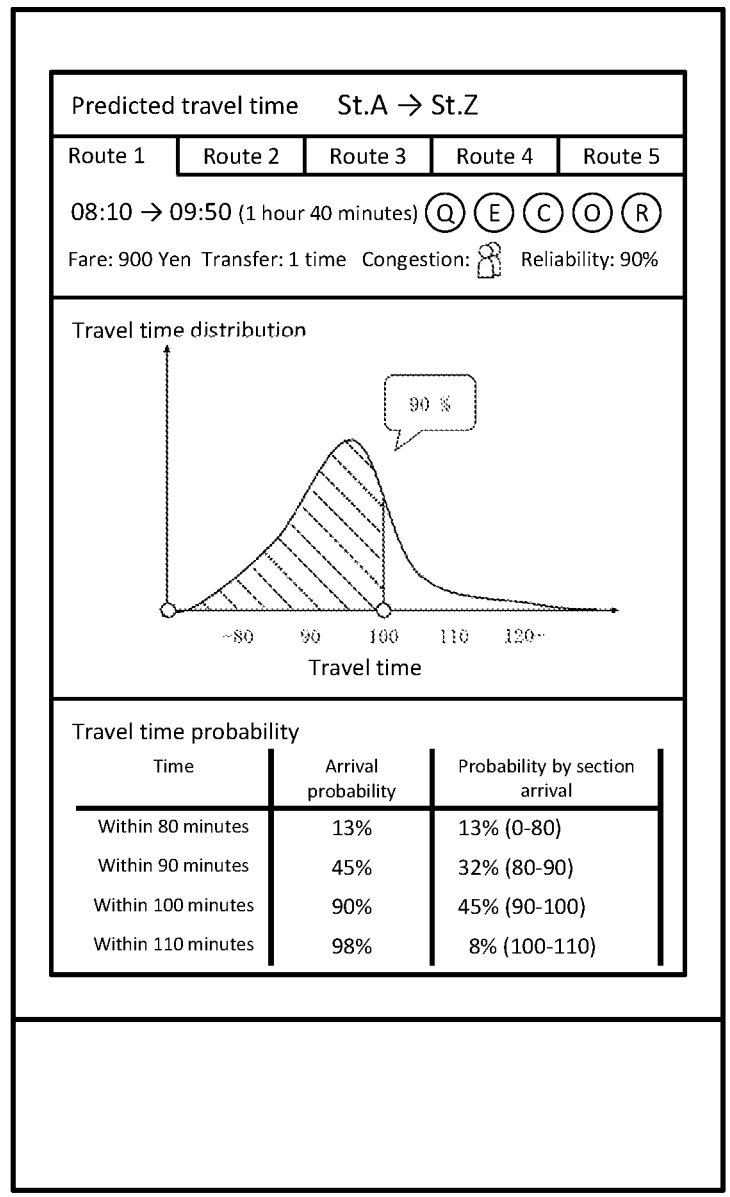
FIG. 14 is a diagram illustrating an example of navigation information displayed on a user terminal according to the first embodiment.

FIG. 14 is navigation information displayed on the user terminal 400 in a case where the input information D06 includes a station of departure (or starting point) that is "st. A", an arrival station (or destination) that is "st. Z", departure time of "8:00", and reliability of "90%".

In FIG. 14, "st. A→st. Z" indicates the station of departure (or starting point) "st. A", and the arrival station (or destination) "st. Z".

In FIG. 14, "Route 1", "Route 2", "Route 3", "Route 4", and "Route 5" are tabs for selecting mutually different route information. Each piece of route information is generated by the transport navigation system 100. Route information corresponding to the selected tab is displayed on the screen of the user terminal. Although description will be made below regarding a case where the "Route 1" tab is selected, cases where other tabs are selected are the same.

In FIG. 14, "08:10 →09:50 (1 hour 40 minutes)" indicates the departure time "08:10" from the station of departure (or starting point), the arrival time "09:50" at the arrival station (or destination), and the travel time "1 hour 40 minutes" from the station of departure (or starting point) to the arrival station (or destination), on route 1. These time points and amounts of time are predicted values.

In FIG. 14, "Fare" indicates the train fare, and "Transfer" indicates the number of time of transferring. "congestion" indicates the congestion of the train traveling on route 1. "Reliability" indicates the reliability relating to the arrival time of route 1.

The congestion is calculated as the number of passengers per railcar from the number of passengers of the train and the number of railcars, using demand predicted information calculated by the demand prediction system 300, for example. In FIG. 14, congestion is displayed in a diagram expression corresponding to the degree of crowding. Reliability is the probability of the train arriving at the arrival station (or destination) by the arrival time (predicted value). Note that reliability may be calculated as a probability in a case of tolerating a certain amount of delay in time, such as "the probability of the train arriving at the arrival station (or destination) by five minutes after the arrival time (predicted value)".

In FIG. 14, the marks where "Quick", "Ease", "Cheap", "Open", and "Reliable" are surrounded by "circle" symbols represent the convenience of "Route 1" in a simple manner. "Quick" indicates the route that will arrive at the arrival station the quickest, "Cheap" indicates that the fare of the route is the least expensive, "Ease" indicates that the route has the fewest number of time of transfer, "Open" indicates that the route has the lowest congestion, and "Reliable" indicates that the route has a reliability that is higher than a predetermined value (e.g., a route with reliability equal to or larger than 90% or the like).

In FIG. 14, the travel time distribution is a display of the probability information list D05 in the format of a probability distribution. The probability information list D05 is calculated by the probability information generation program P01. Upon moving the horizontal-axis pointer to configure the range of the travel time, the probability of the train arriving at the arrival station (or destination) within the configured range of travel time is displayed in the travel time distribution. For example, in FIG. 14, from "0 minutes" to "100 minutes" is configured as the range of the travel time, and "90%" is displayed as the probability of the train arriving at the arrival station (or destination) within that range.

In FIG. 14, the travel time probability is a display of the probability information list D05 in text format. As exemplified in FIG. 14, the travel time probability has "Time", "Arrival probability", and "Probability by section arrival" as items.

The range of travel time from the departure time (0 minutes) is described in "Time".

The probability of the train arriving at the arrival station (or destination) of route 1 within the "Time" in the same row is described in "Arrival probability". For example, the second row of the travel time probability illustrated in FIG. 14 indicates that in a case of the train traveling by route 1, the probability of arriving at the arrival station (or destination) "within 90 minutes" is "45%".

Described in "Probability by section arrival" is the probability of the train arriving at the arrival station (or destination) of route 1 within a time section defined from the range of travel time in one row above, in the item of "Time". For example, the second row of the travel time probability illustrated in FIG. 14 indicates that in a case of the train traveling by route 1, the probability of the train arriving at the arrival station (or destination) between "80 minutes" (the range of travel time in the first row of the item "Time") and "90 minutes" (the range of travel time in the second row of the item "Time") is "32%".

As described above, the transport navigation system 100 according to the first embodiment is provided with a probability information calculating unit that calculates the probability relating to a future operation state on the basis of operation history information prior to the current time. According to this configuration, even in a case where the train schedule diagram is dynamically changed on the current day due to the crowding situation and/or travel demand and so forth, decision-making of passengers can be supported. For example, even in a case where a relief train is run to relieve crowding on a certain line, the probability relating to the travel time to the destination can be calculated from operation history information prior to the current time, and accordingly, decision-making of passengers can be supported.

(1.5 Modifications)

Although the first embodiment has been described above, the first embodiment is not restricted to that which has been exemplified, and various modifications may be made without departing from the essence of the invention.

For example, along with a navigation request, information may be output such as arrival time at the destination, travel time to a transit station, expectation value of the arrival time, expectation value of travel time, transfer time at a transfer station, and so forth. In this case, in addition to the information described in FIG. 4, the route information D30 includes information such as "arrival time", "transit station", "travel time to transit station", "transfer station", "transfer time", and so forth. The "transit station" is information of stations transited through after departing the "start point" up to arriving at the "end point" on this line section of this route. A "transfer line section" is information indicating, regarding the line section of this route, a separate line section to be transferred to in traveling from the end point of this line section. The "transfer station" is information indicating, regarding the line section of this route, a start point on a separate line section to be transferred to in transferring from the endpoint of this line section. For example, in the fourth row and the fifth row in FIG. 4, in order to travel from the endpoint on the "Green Line" which is "St. P" to the start point on the "Blue Line" which is "St. Q", the "transfer station" regarding the line section "Green Line" of route No. 2 is "St. Q" of the "Blue Line". The "transfer time" is, regarding the line section of this route, the amount of time from the train arriving at the end point of this line section until the train, which is planned to be taken departing from the start point of another line section to which the passenger needs to travel to in order to transfer lines, departs.

For example, in a case of outputting information of transfer time, route information including information of transfer time between information of each line section is used for the route information D30, as illustrated in FIG. 15. The "-" in the line section indicates that this row is information of transfer time. Now, the transfer time is calculated by step S402 in the route information generating processing illustrated in FIG. 12. In a case of performing calculation with transfer time added as well in the calculation of the travel time and the travel route in step S402, this may be performed on the basis of known technology (e.g., Japanese Patent Application Publication No. 2007-271283), by the CPU 101 executing the travel time calculation program P03 and the travel route search program P04. A histogram relating to transfer time can be created by referencing the transfer time of the route information D30 in step S504 in FIG. 13. According to such a configuration, information relating to the probability of being able to transfer at each transfer time can be output.

Figure 13:
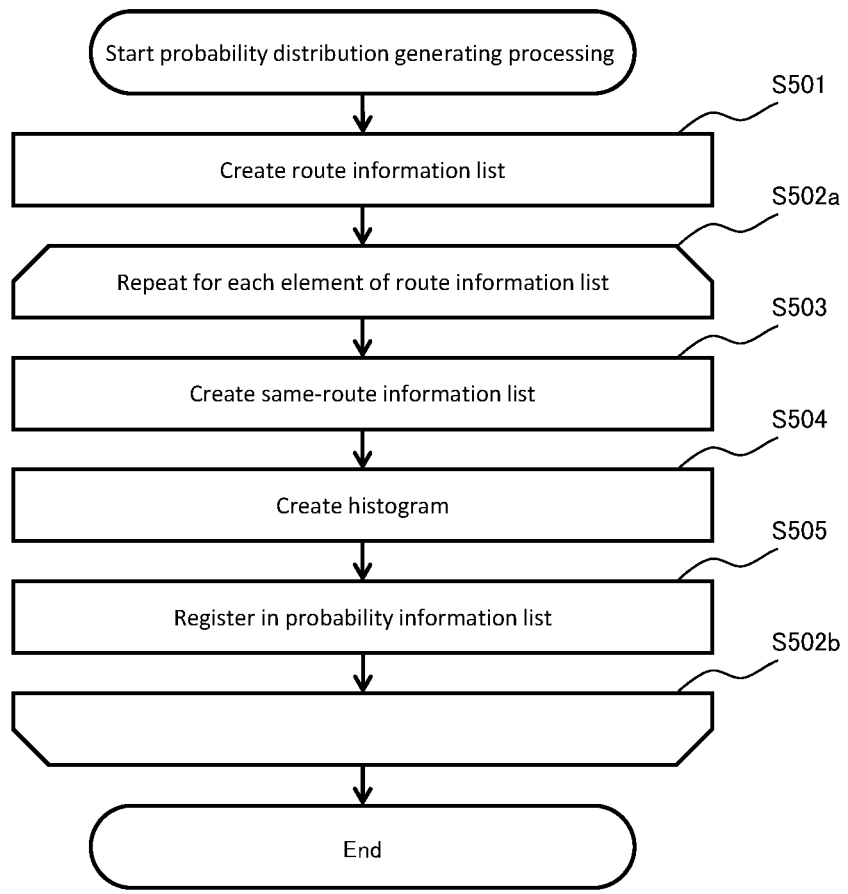
FIG. 13 is a flowchart illustrating details of probability distribution generating processing according to the first embodiment.

For example, regarding lines with a high level of accuracy of the train schedule diagram, or in cases where a line running few trains or the like is assumed to be included in the search target, processing for determining whether or not to deem as being a same route, on the basis of similarity relating to departure time or arrival time may be added to step S503 in the probability distribution calculating processing S204 illustrated in FIG. 13. That is to say, in a case of presenting information of trains to take on a line that runs few trains or the like, a route using a different train may be output as different route information. Specifically, for example, the route information D30 is configured so as to include information such as "train No." in addition to the information described in FIG. 4, and same-route information lists are created for elements where train Nos. are different, as different route information, on particular transportation means and lines specified in advance in step S503. In this case, information presented to passengers includes, in addition to the order of stations on the route such as transit stations and so forth, information of the train No. used as well. Note that "train No." is information indicating a No. identifying a train to be taken from the start point to the end point in the same row. Note that determination processing regarding whether or not to deem as the same route is not restricted to this, and may be carried out using various types of known clustering technologies with regard to departure time and arrival time.

According to this configuration, even in cases where whether transfer is successful or not greatly changes the arrival time to the arrival station (or destination), more appropriate route navigation information can be presented. For example, in a case where the train departing from "St. Q" that is the "transfer station" for route No. 2 in the fourth row and the fifth row in FIG. 4, only runs once an hour, if arrival of the train to "St. P" is delayed and transfer to the train departing from "St. Q" is missed, arrival to the arrival station (or destination) "St. Z" will be delayed by one hour. Now, by outputting routes using different trains as different route information in step S503, probability information can be calculated in the processing of step S504 and thereafter without confusing these two types of cases, and route navigation information can be created. Accordingly, passengers can be presented with more likely information regarding arrival time and transfer time.

Thus, by calculating probability regarding various types of information in the first embodiment of the present invention, various types of navigation information that match desires of passengers and usage scenes can be provided.

Also, in the above-described embodiment, the sample information D50 is generated using current and past actual timetables and actual demand in the sample information generating processing in step S202, in order to improve precision. However, the present embodiment is not limited to this. For example, the sample information D50 may be generated on the basis of current and past actual timetables alone. In a case where appropriate actual demand is not obtainable, for example, actual timetables alone may be used in this way.

Also, in the above-described embodiment, the sample information D50 is generated using current and past predicted timetables and predicted demand in the sample information generating processing in step S202 to raise precision. However, the present embodiment is not limited to this. For example, the sample information D50 may be generated on the basis of current and past actual timetables and actual demand. For example, in a case where suitable predicted integration information is unobtainable, actual integration information may be used in this way.

Also, an example of a case where the train schedule diagram is changed dynamically in accordance with travel demand has been described in the above embodiment, but embodiments of the present invention are not limited to this, and the sample information D50 may be generated using current and past actual timetables alone, for example. According to this configuration, even for lines where diagram undependability is high, such as lines where trains are perpetually running late, for example, information that can support passenger judgment understanding risks can be provided regarding arrival time and transfer time, on the basis of the current state.

Also, in the above-described embodiment, expected arrival time to the destination and the probability of arriving at the destination by this expected arrival time may be calculated and included in the navigation information. Now, the expected arrival time may be calculated by performing calculation with the travel time to the destination as an expectation value, and adding the calculated travel time to the departure time.

Also, in the above-described embodiment, travel route information where the calculated probability is greater than a predetermined threshold value may be recommended to the user terminal.

For example, in a case of calculating travel route information where the probability is greater than a predetermined threshold value, input information including information of the threshold value is used as the input information D06. Now, extracting the recommended travel route information can be performed by comparing the probability calculated by the probability distribution generating processing illustrated in FIG. 13, and this threshold value included in the input information. According to this configuration, travel route information where the calculated probability is greater than a predetermined threshold value can be recommended to the user terminal.

Second Embodiment

In a second embodiment, probability distribution that is weighted by similarity is generated, using actual demand and/or predicted demand, in the probability distribution generating processing of step S204 in the first embodiment.
(2.1 Details of Step S204: Probability Distribution Generating Processing)

Figure 16:
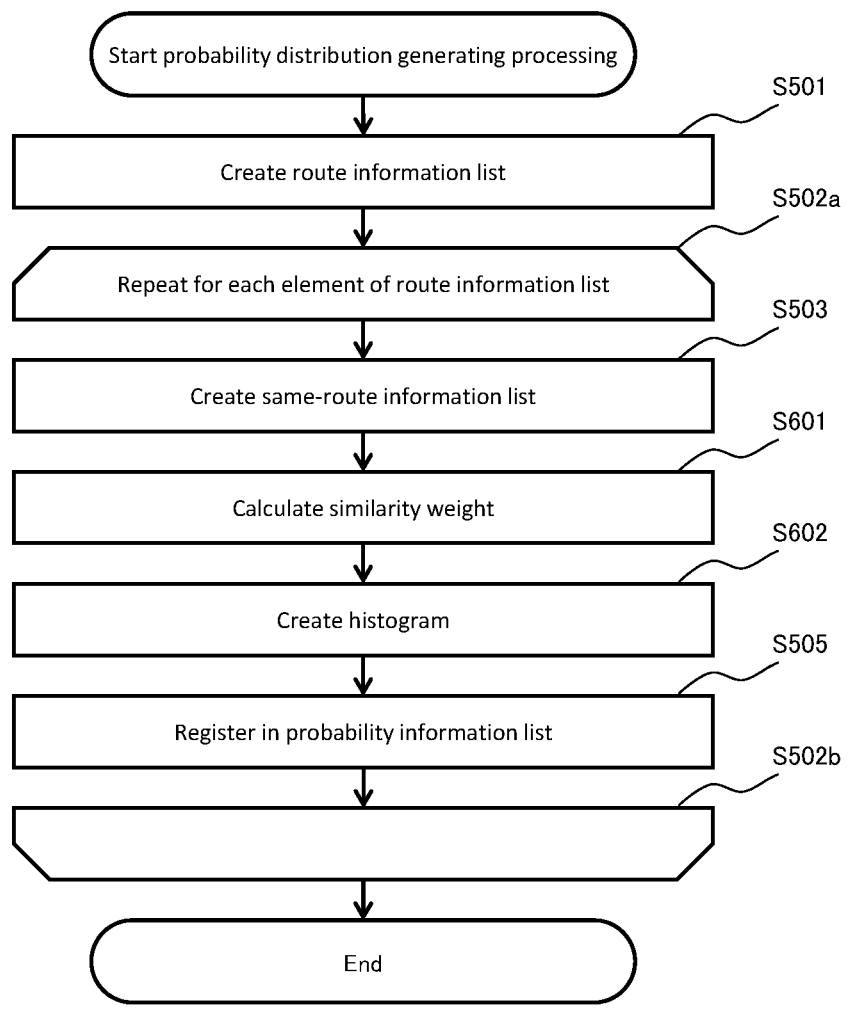
FIG. 16 is a flowchart illustrating details of probability distribution generating processing according to a second embodiment.

The probability distribution generating processing in step S204 (see FIG. 10) according to the second embodiment will be described with reference to the flowchart illustrated in FIG. 16.

Processing from step S501 to step S503, and processing from step S505 to step S502b, are the same as in the first embodiment.

As step S601, the CPU 101 that executes the probability information generation program P01 calculates a similarity weight. The similarity weight is a weighting coefficient regarding the similarity of current predicted demand and past predicted demand. For example, the difference (error) between past predicted demand and current predicted demand is calculated by the probability information generation program P01 as similarity weight (w) regarding all pieces of sample information D50 registered in a same-route information list. The probability information generation program P01 then normalizes the similarity weight calculated regarding all pieces of sample information registered in the same-route information list. For example, the CPU 101 performs normalization by calculating $\exp(-w^2)$ from the above-described calculated similarity weight (w) and Napier's constant. The similarity weight is calculated by the above processing.

As step S602, the CPU 101 generates a histogram on the basis of the same-route information list created in step S503 and the similarity weight calculated in step S601. For example, the CPU 101 first configures a predetermined class width. The CPU 101 next references the travel time in the route information D30 and calculates a total value of travel time on this route, for all pieces of sample information D50 in the same-route information list. The CPU 101 then adds the similarity weight corresponding to this sample information to the class width including the travel time of the total value.

As described above, the second embodiment is a configuration that calculates similarity width on the basis of actual demand before the current time. According to this configuration, the precision of probability information can be raised. For example, in a case where crowding occurs on a line due to a periodically-held event, and a relief train is run, the similarity of each actual timetable can be evaluated from the actual demand before the current time, and information with a high level of similarity with the current actual timetable can be weighted. Thus, navigation information that is more precise as compared to a case of simply adding the arrival frequency corresponding to the class width can be provided.

Also, in the above-described embodiment, the similarity weight is calculated from current and past predicted demand in the similarity weight calculating processing in step S601 to raise precision. However, the present embodiment is not limited to this. For example, the similarity weight may be calculated from current and past actual demand. In a case where suitable predicted demand is unobtainable, for example, actual demand may be used in this way.

SUMMARIZATION OF THE PRESENT INVENTION

A transport navigation system according to the present invention is a system that, upon input information including information of a starting point and information on destination being input, searches for a route to travel from the starting point to the destination by a transportation means including a train on the basis of the input information, and outputs travel route information relating to the travel route that has been obtained. The transport navigation system includes the input information, an actual timetable regarding which the transportation means has actually operated, and a statistical information computing unit. The statistical information computing unit is configured to use the actual timetable and the input information to calculate a travel route from the starting point to the destination and statistical amount relating to a travel time according to the travel route, and generate the travel route information using the travel route and the statistical amount.

The statistical information computing unit calculates the statistical amount regarding the travel routes calculated from the starting point and the destination specified in the input information, using information of travel time in operation history accumulated in the past. The statistical information computing unit here is, for example, a program that generates probability information relating to navigation information from actual timetables and input information.

Accordingly, a statistical amount (e.g., histogram) relating to the travel route and the travel time thereof are calculated from past operation history, and travel route information is generated on the basis of the travel route and statistic amount, so suitable route navigation information can be presented in light of past history, even in a case where dynamic change of train schedule diagrams is assumed, and there is a possibility that suitable travel routes and travel time in the future may change.

The transport navigation system may further include actual demand including information relating to travel of passengers, and the statistical information computing unit may be configured to use the input information, the actual timetable, and the actual demand to calculate the travel route and the statistical amount.

The statistical information computing unit calculates the statistical amount regarding each travel route calculated from the starting point and the destination specified in the input information, using information of travel time in operation history, that has been narrowed down by referencing history of demand, for example.

Accordingly, the travel route and the statistical amount are calculated taking not only train operations but also demand into consideration, and accordingly the travel route and the statistical amount can be calculated with a high level of precision.

The transport navigation system may further include a predicted timetable including information of history of operations of the transportation means up to the current time and information predicting operations of the transportation means after the current time. The statistical information computing unit may be configured to use the input information, the actual timetable, and the predicted timetable to calculate the travel route and the statistical amount.

The statistical information computing unit calculates the statistical amount using information of travel time in operation history narrowed down by referencing prediction results of train operations, for example.

Accordingly, the travel route and the statistical amount are calculated using history of train operations, taking into consideration prediction results of train operations performed in the past as well, and accordingly the travel route and the statistical amount can be calculated with a high level of precision.

The transport navigation system may further include one or both of a predicted timetable including information of history of operations of the transportation means up to the current time and information predicting operations of the transportation means after the current time, and predicted demand including information of history of travel of passengers up to the current time and information predicting travel of passengers after the current time. The statistical information computing unit may be configured to use the input information, the actual timetable, the actual demand, and one or both of the predicted timetable and the predicted demand to calculate the travel route and the statistical amount.

The statistical information computing unit calculates the statistical amount using information of travel time in operation history narrowed down by referencing one or both of prediction results of train operations and prediction results of demand, for example.

Accordingly, the travel route and the statistical amount are calculated using history of train operations, taking into consideration one or both of prediction results of train operations performed in the past and prediction results of demand, and accordingly the travel route and the statistical amount can be calculated with a high level of precision.

The statistical information computing unit may be configured to generate sample information using the actual timetable, and calculate the travel route and the statistical amount using the sample information.

The statistical information computing unit uses sample information where actual timetables are narrowed down by predetermined conditions, for example to calculate the travel route and the statistical amount.

Accordingly, the travel route and the statistical amount can be calculated with a high level of precision using sample information.

The statistical information computing unit may be configured to calculate a similarity between train operations up to the current time and each actual timetable, using the actual timetable, and to calculate the travel route and the statistical amount using the input information, the actual timetable, and the similarity.

For example, differences in departure time and/or arrival time of the trains can be cumulated, and similarity can be calculated by computation where the smaller the cumulative value is, the higher the similarity is. Operation history where similarity to train operations up to the current time is high can be weighted with a greater weight, for example, and the travel route and the statistical amount thus be calculated.

In this way, similarity with train operations is used for calculating the travel route and the statistical amount, and accordingly the travel route and the statistical amount can be calculated with a high level of precision.

In the travel route information, each arrival time at the destination, and the probability of arriving at the destination by the predicted arrival time, may be associated with each other. Also, in the travel route information, each travel time to the destination, and the probability of arriving at the destination within the predicted travel time, may be associated with each other. Also, the travel route information may include an expectation value of arrival time to the destination. Also, the travel route information may include an expectation value of travel time to the destination.

The statistical information computing unit searches for travel routes, and calculates information of travel time. By referencing this travel time, the statistical information computing unit calculates the probability of arriving at the destination by the predicted arrival time, the probability of arriving at the destination within the predicted travel time, an expectation value of arrival time to the destination, or an expectation value of travel time to the destination.

Accordingly, the user can be presented with the probability of arriving at the destination by the predicted arrival time, the probability of arriving at the destination within the predicted travel time, an expectation value of arrival time at the destination, or an expectation value of travel time to the destination, along with the travel route, at the user terminal.

The travel route information may include information of a probability distribution indicating the probability of arriving at the destination by each arrival time. Also, the travel route information may include information of a probability distribution indicating the probability of arriving at the destination within each travel time.

The statistical information computing unit calculates a probability distribution with the arrival time as a stochastic variable. Also, the statistical information computing unit calculates a probability distribution with the travel time as a stochastic variable.

Accordingly, the user can be presented with a probability distribution indicating the probability of arriving at the destination by each arrival time, or a probability distribution indicating the probability of arriving at the destination within each travel time, along with the travel route, at the user terminal.

In the travel route information, each transfer time at stations transited through to reach the destination, and the probability of transferring at the transfer time, may be associated with each other. Also, the travel route information may include information of a probability distribution indicating the probability of each transfer time at stations transited through to reach the destination.

In a case of calculating a probability of transfer time, the statistical information computing unit searches for a travel route including transfer information, and calculates information of travel time including information of transfer time. Further, in calculating of the statistical amount relating to the travel time, the statistical information computing unit calculates the probability relating to the transfer time by referencing the transfer time.

Accordingly, the user can be presented with a probability distribution indicating the probability of transferring at the transfer time or the probability of each transfer time, along with the travel route, at the user terminal.

The transfer route information may include only the transfer route information of which the probability is greater than a predetermined threshold value.

In a case of calculating only travel route information of which the probability is greater than the predetermined threshold value, the statistical information computing unit uses input information including information of the threshold value. The statistical information computing unit thus uses the threshold value included in the input information to extract travel route information of which the calculated probability is greater than the predetermined threshold value.

Accordingly, the user can be presented with just travel route information of which the probability is greater than the predetermined threshold value at the user terminal.

The above-described embodiments are exemplifications for describing the present invention, and are not intended to restrict the scope of the present invention to just the embodiments. One skilled in the art will be able to carry out the present invention in various other forms, without departing from the essence of the present invention.

REFERENCE SIGNS LIST

100 Transport navigation system
101 CPU
102 Memory
103 Input apparatus
104 Storage unit
105 Transmitting and receiving unit
106 Communication unit
200 Traffic management system
300 Demand prediction system
400 User terminal
500 Communication network
600 Communication network

The invention claimed is:

1. A transport navigation system, which, upon input information including information on a starting point and information on destination being input, searches, on the basis of the input information, for a travel route that is a route to travel from the starting point to the destination by a transportation means including a train, and which outputs travel route information relating to the travel route that has been obtained, the transport navigation system comprising:
the input information;
an actual timetable, according to which the transportation means has actually operated; and
a statistical information computing unit, wherein
the statistical information computing unit is configured, by using the actual timetable and the input information, to calculate a travel route from the starting point to the destination and a statistical amount about a travel time according to the travel route, and generate the travel route information using the travel route and the statistical amount;
the statistical information computing unit is configured, when calculating, by using the actual timetable and the input information, a travel route from the starting point to the destination and a statistical amount about a travel time according to the travel route,
by comparing actual timetable up to a day before a current day of operation and an actual timetable on the current day of operation, to specify past operation history in which departure time error from a current day of operation is a predetermined threshold value or below and to calculate the travel route and the statistical amount based on the specified history.

2. The transport navigation system according to claim 1, further comprising
one or both of
a predicted timetable including information on history of operations of the transport means up to the current time and information predicting operations of the transport means after the current time, and
predicted demand including information on history of travel of passengers up to the current point and information predicting travel of passengers after the current time,
wherein
the statistical information computing unit is configured to, when calculating, by using the actual timetable and the input information, a travel route from the starting point to the destination and the statistical amount relating to a required time according to the travel route, compare one of predicted timetable up to a day before a current day of the operation and predicted timetable of the current day of operation or predicted demand up to a day before a current day of the operation and predicted demand of the current day of operation, or both of them, thereby specifying past operation history in which departure time error from a current day of operation is a predetermined threshold value or below or past operation history in which demand error from a current day of operation is a predetermined threshold value or below, or past operation history satisfying both of them, and calculating the travel route and the statistical amount based on the specified history.

3. The transport navigation system according to claim 1, wherein
in the travel route information, each arrival time at the destination and probability of arriving at the destination by the arrival time are associated with each other, or,
in the travel route information, each travel time to reach the destination and probability of arriving at the destination within the travel time are associated with each other, or,
the travel route information includes an expectation value of the arrival time at the destination, or
the travel route information includes an expectation value of travel time to reach the destination.

4. The transport navigation system according to claim 3, wherein the transfer route information includes only the transfer route information, the probability of which is greater than a predetermined threshold value.

5. The transport navigation system according to claim 1, wherein
the travel route information includes information on a probability distribution indicating probability of arriving at the destination by each arrival time, or
the travel route information includes information on a probability distribution indicating probability of arriving at the destination within each travel time.

6. The transport navigation system according to claim 1, wherein
in the travel route information, each of transfer time at transit stations used to reach destination and probability of transferring in the transfer time are associated with each other, or,
the travel route information includes information on a probability distribution indicating probability of each transfer time at transit stations used to reach the destination.

7. A transport navigation system, which, upon input information including information on a starting point and information on destination being input, searches, on the basis of the input information, for a travel route that is a route to travel from the starting point to the destination by a transportation means including a train, and which outputs travel route information relating to the travel route that has been obtained, the transport navigation system comprising:
the input information;
an actual timetable, according to which the transportation means has actually operated; and
a statistical information computing unit, wherein
the statistical information computing unit is configured, by using the actual timetable and the input information, to calculate a travel route from the starting point to the destination and a statistical amount about a travel time according to the travel route, and generate the travel route information using the travel route and the statistical amount, wherein the statistical information computing unit is configured to generate sample information by using the actual timetable and calculate the travel route and the statistical amount by using the sample information.

8. A transport navigation system, which, upon input information including information on a starting point and information on destination being input, searches, on the basis of the input information, for a travel route that is a route to travel from the starting point to the destination by a transportation means including a train, and which outputs travel route information relating to the travel route that has been obtained, the transport navigation system comprising:
the input information;
an actual timetable, according to which the transportation means has actually operated; and
a statistical information computing unit, wherein
the statistical information computing unit is configured, by using the actual timetable and the input information, to calculate a travel route from the starting point to the destination and a statistical amount about a travel time according to the travel route, and generate the travel route information using the travel route and the statistical amount,
wherein
the statistical information computing unit is configured to, by using the actual timetable, calculate a similarity between operation of the transportation means up to the current time and each actual timetable, and
by using the input information, the actual timetable, and the similarity, calculate the travel route and the statistical amount.

9. A transport navigation system, which, upon input information including information on a starting point and information on destination being input, searches, on the basis of the input information, for a travel route that is a route to travel from the starting point to the destination by a transportation means including a train, and which outputs travel route information relating to the travel route that has been obtained, the transport navigation system comprising:
the input information;
an actual timetable, according to which the transportation means has actually operated; and
a statistical information computing unit, wherein
the statistical information computing unit is configured, by using the actual timetable and the input information, to calculate a travel route from the starting point to the destination and a statistical amount about a travel time according to the travel route, and generate the travel route information using the travel route and the statistical amount,
wherein the statistical information computing unit is configured to, when calculating, by using the actual timetable and the input information, a travel route from the starting point to the destination and a statistical amount about a travel time according to the travel route, classify the travel route into one or more groups on the basis of similarity relating to departure time or arrival time, and create travel route information corresponding to the travel route of each of the group into which the classification has been performed.

10. A transport navigation system, which, upon input information including information on a starting point and information on destination being input, searches, on the basis of the input information, for a travel route that is a route to travel from the starting point to the destination by a transportation means including a train, and which outputs travel route information relating to the travel route that has been obtained, the transport navigation system comprising:
the input information;
an actual timetable, according to which the transportation means has actually operated; and
a statistical information computing unit, wherein
the statistical information computing unit is configured, by using the actual timetable and the input information, to calculate a travel route from the starting point to the destination and a statistical amount about a travel time according to the travel route, and generate the travel route information using the travel route and the statistical amount,
the statistical information computing unit is configured, when calculating, by using the actual timetable and the input information, a travel route from the starting point to the destination and a statistical amount about a travel time according to the travel route,
by comparing actual demand up to a day before a current day of operation and an actual demand of a current day of operation, to specify past operation history in which error of the number of passengers on the train from a current day of operation is a predetermined threshold value or below and to calculate the travel route and the statistical amount based on the specified history.

11. A transport navigation method, with which, upon input information including information on a starting point and information on a destination being input, a travel route that is a route to travel from the starting point to the destination by a transportation means including a train is searched for on the basis of the input information, and travel route information relating to the travel route that has been obtained is output, the method comprising, by a computer:
calculating a travel route from the starting point to the destination and a statistical amount about a travel time according to the travel route on the basis of an actual timetable, according to which the train has actually been operated, and the input information, and generating the travel route information on the basis of the travel route and the statistical amount, when calculating, by using the actual timetable and the input information, a travel route from the starting point to the destination and a statistical amount about a travel time according to the travel route, by comparing actual timetable up to a day before a current day of operation and actual timetable of a current day of operation, specifying past operation history in which departure time error from a current day of operation is a predetermined threshold value or below and calculating the travel route and the statistical amount based on the specified history.

12. A transport navigation method, which, upon input information including information on a starting point and information on destination being input, searches, on the basis of the input information, for a travel route that is a route to travel from the starting point to the destination by a transportation means including a train, and which outputs travel route information relating to the travel route that has been obtained, the method comprising by a computer:

by using the actual timetable and the input information that a train actually operated, calculating a travel route from the starting point to the destination and a statistical amount about a travel time according to the travel route;

generating the travel route information using the travel route and the statistical amount, wherein the computer is configured, when calculating, by using the actual timetable and the input information, a travel route from the starting point to the destination and a statistical amount about a travel time according to the travel route, by comparing actual demand relating to passenger travel up to a day before a current day of operation and actual demand of a current day of operation, to specify past operation history in which error of the number of passengers in the train from a current day of operation is a predetermined threshold value or below and to calculate the travel route and the statistical amount based on the specified history.

\* \* \* \* \*